Feb. 24, 1970    J. E. BUXTON    3,496,759
STARTER DRIVE WITH FRICTION ADVANCE AND INERTIA RELEASE
Filed June 6, 1968

JAMES E. BUXTON
INVENTOR.

BY

United States Patent Office 3,496,759
Patented Feb. 24, 1970

3,496,759
STARTER DRIVE WITH FRICTION ADVANCE
AND INERTIA RELEASE
James E. Buxton, Horseheads, N.Y., assignor to The
Bendix Corporation, a corporation of Delaware
Filed June 6, 1968, Ser. No. 734,998
Int. Cl. F02n 11/00
U.S. Cl. 74—7                                        6 Claims

ABSTRACT OF THE DISCLOSURE

A starter drive shiftable between disengaged and engaged positions with an engine ring gear having a friction connection for retarding the rotary motion of the starter drive and, thereby, induce axial translation to affect the transfer of the starter drive between its engine disengaged and engaged position. The improvement in such a drive of a selectively-energized latching solenoid, either in the starting motor circuit or energized and de-energized concurrently therewith for selectively applying and releasing the aforementioned friction connection to obtain a starter drive which positively moves into engagement under the influence of retarding friction, but which disengages predominantly on an inertia principle. The solenoid latch is so designed as to minimize and control the level of high shock loads and the like.

BRIEF SUMMARY OF INVENTION

Starter drives which advance both into and out of engagement with an engine gear by inertia are well-known as are drives that are positively shifted by powerful solenoids. A third class of starter drives exist which may be considered a middle ground between the two-mentioned types and employ frictional means to advance the starter drive positively and firmly into engagement and retain it in engagement with reliability comparable to positive shift devices, but do not require powerful and expensive shifting solenoids and, in the avoidance, have an aspect in common with inertia drives. Examples of the third class of drives may be found in U.S. Patent 3,299,719—Toulier, and co-pending, commonly-assigned U.S. patent application Ser. No. 680,258, filed Nov. 2, 1967, and entitled "Starter Drive With Selectively-Releasable Friction Advance Mechanism."

While such drives with frictional advance means achieve the objectives of engagement and hold-in comparable to positive shift devices, their disengagement characteristic is either slow and impositive or made positive only by the addition of expensive and complex added means. In Toulier's referenced patent, a retraction spring is utilized to achieve disengagement, but this force is limited in the sense that it opposes the frictionally-generated force and, thus, must be selected to always be sufficiently inferior to the friction force as not to interfere with the positive engagement characteristic. In co-pending application Ser. No. 680,258, armature brake means are suggested to generate a high inertia retraction force which avoids the design dilemma, but only in a complex and expensive way.

It is the object of the present invention to provide, in a starter drive having frictional means for advancing the drive into its cranking position, a solenoid latching device capable of selectively latching or freeing the friction connection so that the drive is engaged by a frictional advance, but disengages substantially entirely by inertia forces.

It is a further object of the invention to accomplish selective latching of a frictional advance connection by a latch mechanism insulated from high shock such that the latch mechanism may be very simple and inexpensive in design, but have good life and durability.

It is another object of the invention to provide a selective latching device for a frictional advance connection wherein the latch is a solenoid-actuated device, either in the circuit of a starter motor or concurrently energized and de-energized with the starter motor.

Other objects and advantages of the invention will become apparent to those skilled in the art on consideration of the attached specification and claims.

DETAILED DESCRIPTION

Figures 1, 2:
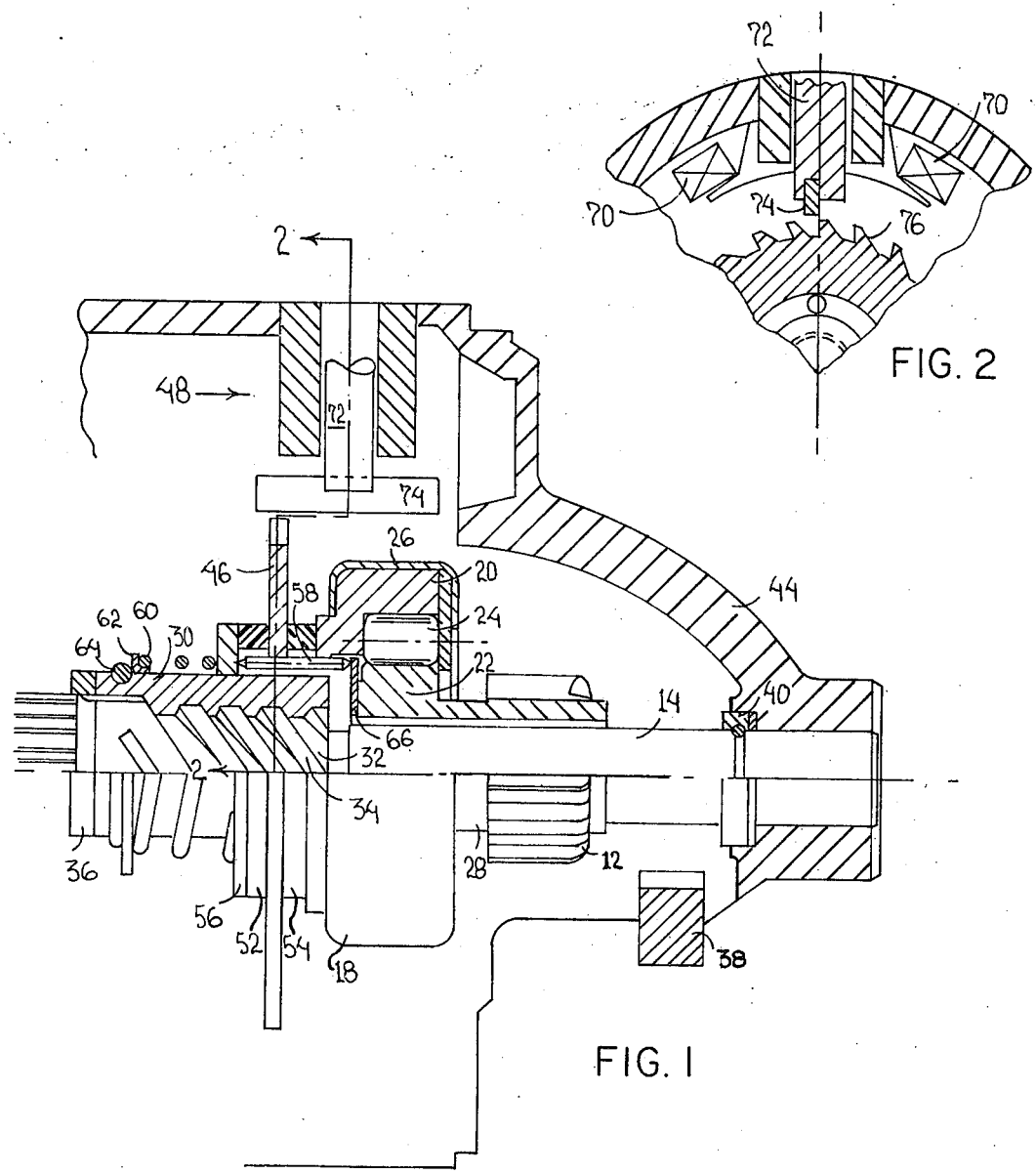
FIGURE 1 shows a cross-sectional view of a starter drive with friction advance and a latching device for selectively latching and releasing the frictional connection in accordance with the principles of this invention.
FIGURE 2 is a partial and broken away section, taken along section line 2—2 of FIGURE 1 showing, in another view, the latching mechanism.

Referring to the drawings, the starter drive includes a pinion gear 12 slidably mounted on a shaft 14. The shaft 14 is rotated by a starter motor, not shown, usually selectively energized when an operator turns or depresses a starting switch in a manner well-known to automobile users. A unidirectional overrunning roller clutch of well-known construction is generally designated by numeral 18 and has an annular outer race 20 and annular inner race 22 and a plurality of drive rollers, one of which is illustrated at 24. The roller clutch is encased in a bent-over sheet metal member 26. Inner race 22 is integrally connected by web 28 with pinion 12.

Sleeve member 30 is integrally formed or connected with the outer race 20 of the roller clutch and has formed on its inner diameter, helical screw threads or splines 32 which slidably and threadedly engage a mating helical screw shaft or spline 34 formed on motor driven shaft 14.

Pinion 12, clutch 18, and sleeve 30 comprise the shiftable portion of the starter drive, illustrated in its disengaged or retracted position against a thrust washer 36. The helical screw shaft connection 32, 34 permits this shiftable portion to both rotate with shaft 14 and advance to a limited extent axially on the shaft, whereby pinion 12 is brought into mesh with engine gear or flywheel 38 for cranking. The rightmost limit of travel of pinion 12, as viewed in FIGURE 1, is defined by abutment with thrust washer 40 supported by housing extension 44 of the starter motor housing.

An axial force component for translating the shiftable portion of the starter drive from its disengaged to its engaged position with respect to enginge gear 38 is developed by the interaction of a friction retarding connection and the helical shaft mounting. Particularly, there is provided an annular plate 46 concentric with sleeve 30 and adapted to be selectively latched or released by latching means, generally designated by numeral 48. A pair of rings of friction material 52 and 54 are disposed on opposite sides of plate 46, one of which may be bonded to clutch 18 and the other to the annular pressure plate 56, slidably mounted on the outer surface of sleeve 30. A resilient member or coil spring 60 is concentrically mounted about sleeve 30 and bears on one end against pressure plate 56 and is confined on its other end by a retainer 62, held by C-ring connector 64. Resilient member 60 applies a force bringing, through pressure plate 56, friction members into contact with a predetermined force against non-rotative plate 46. The friction connection, thus provided, retards the rotation of the shiftable portion of the starter drive which induces a threading action on the screw shaft, translating the shiftable portion axially towards its engaged position with engine gear 38.

An annular thrust ring 66 is disposed within the cavity of the roller clutch and bears on one side against inner race 22 and on the other side, against pins 58 which extend through the clutch and bear against pressure plate 56. As pinion 12 strikes thrust washer 40 at the full end of its engaged cranking position, maximum starting torque is delivered from motor to engine through the starting gear, developing very high forces through the screw shaft connection, causing sleeve 30 and outer race 20 to continue to traverse axially, even though inner race 22 and pinion 12 have hit a solid abutment. For this purpose, a space has been left in the clutch cavity which permits a limited degree of relative axial or telescoping movement between inner and outer clutch races and their connected structure. However, pressure plate 56 is prevented from following sleeve 30 and outer race 20 through this last increment of travel as pins 58 and washer 66 abut the inner race 22, thus releasing the resilient spring-loaded friction connection with plate 46. Thus, when full cranking torque is transmitted, the frictional drag is eliminated so as not to dissipate needed cranking power.

Relative to prior devices, the invention is distinguished by the elimination of retraction springs (although light anti-drift springs are not precluded) and of any external braking means to artificially generate high inertia forces for retraction. In lieu of such self-defeating or expensive arrangements, latching means 48 is provided which is comprised of solenoid coil 70, plunger 72, a track 74 secured to the plunger 72 and aligned in an axial direction parallel to the starter drive axis, and circumferentially-arranged teeth 76 formed on the outer periphery of plate 46.

When coil 70 is energized, plunger 72 is pulled downwardly, dropping track 74 into teeth 76 so that plate 46 becomes fixed in a rotative, but not axial sense, thereby rendering the friction connection operative to advance the starter drive into cranking engagement with engine gear 38. When coil 70 is de-energized, plunger 72 retracts to its relaxed position, freeing plate 46 to freely rotate so that friction cannot be generated. Coil 70 is preferably in the same circuit as the starter motor or actuated or de-actuated concurrently through a ganged switch to achieve primarily de-energization immediately as the operator returns the starting switch to its off mode.

The various beneficial features of the present invention may be best understood by discussion of a complete starting cycle sequence of operations. The parts assume at rest the relative positions illustrated in FIGURE 1. As the operator depresses a starting switch, a starting motor is energized, initiating rotation of shaft 14 and, concurrently, coil 70 is energized so that plate 46 is restrained rotationally. The shiftable portion of the drive, consisting of sleeve 30, clutch 18, pinion 12 and associated elements, including friction connection and plate 46, translate axially toward engine gear 38, due to the previously-mentioned combination of frictional retarding effect and helical splines 32 and 34. As the shiftable portion moves in the direction of cranking engagement, plate 46 retains engagement with track 74 so that the frictional retarding effect is preserved and the device continues to translate. When pinion 12 first engages engine gear 38, starting or motor torque is transmitted through helical splines 32 and 34 causing a strong screw jack action, developing a high order of forces so that pinion 12 proceeds to full engagement with gear 38. As pinion 12 strikes thrust washer 40, it will cease to move axially, but will continue to rotate with shaft 14, bringing the gear 38 up in speed. Outer race 20 and sleeve 30 will continue to translate axially, causing inner race 22 to telescope within outer race 20 through pins 58 and plate 56 to release the friction connection. Thus, the friction connection will not utilize a portion of the output of a starting motor during peak cranking load conditions.

In the event of a false engine start, engine gear 38 may temporarily accelerate pinion 12 faster than starter motor speed, in which case, roller clutch 18 overruns, the strong screw jack action is lost, and the drive begins disengagement under the influence of inertia. However, only limited withdrawal motion will occur insufficient to accomplish disengagement before the friction connection is re-applied, providing a force retaining the pinion in engagement. Thus, positive engagement is achieved even for false or temporary engine start conditions.

It will be observed at this point that any of the shock or impact loads encountered either due to pinion 12 abutting washer 40, the bottoming out of the clutch after telescoping or the incipient movement toward disengagement during false start, will not be directly imposed on plunger 72 of the latching mechanism due to the parallel alignment of track 74 to the starter drive axis. All such unwanted loads, as are passed back to the latching means, must be transferred through the friction connection and, thus, is limited to the transfer capabilities of the friction connection. This load limiting feature permits the use of a relatively-minor and low-cost solenoid latch which, nevertheless, produces good reliability and long service life.

If the operator is satisfied that a sustaining engine start has been accomplished, he will now turn off the starting switch, simultaneously de-energizing starter motor and coil 70. Latch 48 will disengage, freeing plate 46, and rendering inactive the friction connection, thus voiding all forces tending to hold the drive in engagement. The inertia forces generated by the decelerating starter motor disengage the drive unimpeded by other forces in the manner of a pure inertia starter drive.

Various modifications to the invention may be made by the man skilled in the art without departing from the invention.

I claim:
1. A starter drive comprising:
    a motor driven shaft having first helical screw heads connected thereto;
    a shiftable drive portion mounted on said driven shaft comprised of a sleeve member having second helical screw threads slidably engaging said first helical screw threads, a unidirectional one-way clutch, and a drive pinion;
    friction connection means operative when developing a friction force to retard rotation of said shiftable drive portion and cause said shiftable drive portion to advance axially on said driven shaft; and
    latching means operative to selectively engage said friction connection means to selectively develop a friction force, said latching means adapted to be actuated and de-actuated substantially concurrently with a starting motor.
2. A starter drive comprising:
    a motor driven shaft having first helical screw threads connected thereto;
    a shiftable drive portion mounted on said driven shaft comprised of a sleeve member having second helical screw threads slidably engaging said first helical screw threads, a unidirectional one-way clutch, and a drive pinion;
    friction connection means including an annular plate frictionally connected to said shiftable drive portion, operative when said plate is restrained from rotating to develop a friction force retarding and axially advancing said shiftable drive portion; and
    latching means operative to selectively engage said annular plate and restrain said plate from rotating while permitting axial travel thereof.
3. A starter drive as claimed in claim 2 wherein:
    said latching means is a solenoid-actuated locking device including a plunger member having a track and groove interconnection with said annular plate.

4. A starter drive as claimed in claim 3 wherein:
said track and groove interconnection is aligned in parallel with the axial axis of said shiftable drive portion to avoid the imposition of directly-applied shock loads on said plunger.

5. A starter drive comprising:
a motor driven shaft having first helical screw threads connected thereto;
a shiftable drive portion mounted on said driven shaft comprised of a sleeve member having second helical screw threads slidably engaging said first helical screw threads, a unidirectional one-way clutch, and a drive pinion;
an annular friction ring concentric and connected to said shiftable drive portion:
an annular friction plate member in confronting relationship with said friction ring;
resilient means mounted on said shiftable drive portion, applying a force to frictionally and contactively engage said annular friction plate and ring members; and
a latching solenoid having a coil and plunger, said plunger operative on energization of said solenoid to restrain said annular friction plate member against rotation while permitting axial travel thereof.

6. A starter drive as claimed in claim 5 wherein:
said annular friction plate member has a plurality of teeth circumferentially arranged around the outer periphery thereof; and
said latching solenoid includes an axially-aligned track member secured to the end of said plunger such that said track engages said teeth on energization of said coil.

References Cited

UNITED STATES PATENTS

| | | | |
|---|---|---|---|
| 2,332,986 | 10/1943 | Buxton | 74—7 |
| 2,341,516 | 2/1944 | Rose | 74—7 |
| 2,925,810 | 2/1960 | Mendenhall | 74—7 X |

MILTON KAUFMAN, Primary Examiner